(12) United States Patent
Dierks et al.

(10) Patent No.: US 7,547,178 B1
(45) Date of Patent: Jun. 16, 2009

(54) HYDRAULIC TAIL TRAILER

(76) Inventors: Dale Dierks, 1406 Roland La., Mitchell, SD (US) 57301; Ray Paradis, 501 Greenridge La., Mitchell, SD (US) 57301; A. Dean Oehlerking, P.O. Box 1188, Mitchell, SD (US) 57301; Brent Hohman, P.O. Box 47, Fulton, SD (US) 57340; Cynthia Bjerrum, 25266 Wild Plum La., Mitchell, SD (US) 57301

( * ) Notice: Subject to any disclaimer, the term of this patent is extended or adjusted under 35 U.S.C. 154(b) by 470 days.

(21) Appl. No.: 11/179,684

(22) Filed: Jul. 11, 2005

(51) Int. Cl.
*B60P 1/04* (2006.01)
(52) U.S. Cl. .................................... 414/484
(58) Field of Classification Search ............... 414/483, 414/485
See application file for complete search history.

(56) References Cited

U.S. PATENT DOCUMENTS

| | | | | |
|---|---|---|---|---|
| 2,173,277 A | * | 9/1939 | Jarmin et al. | 414/482 |
| 3,064,842 A | * | 11/1962 | Haynie | 414/482 |
| 4,372,727 A | * | 2/1983 | Fredrickson et al. | 414/537 |
| 4,498,836 A | * | 2/1985 | Love | 414/537 |
| 5,033,931 A | * | 7/1991 | Mann | 414/480 |
| 5,215,426 A | * | 6/1993 | Bills, Jr. | 414/537 |
| 5,234,308 A | * | 8/1993 | Mann | 414/480 |
| 6,161,997 A | * | 12/2000 | Furlong | 410/24 |
| 6,394,734 B1 | * | 5/2002 | Landoll et al. | 414/480 |

FOREIGN PATENT DOCUMENTS

GB    2186238 A  *  8/1987

* cited by examiner

*Primary Examiner*—Saúl J Rodriguez
*Assistant Examiner*—Joshua I Rudawitz
(74) *Attorney, Agent, or Firm*—Dennis L. Thomte; Thomte Patent Law Office LLC

(57) ABSTRACT

A hydraulic tail trailer comprising a main deck having a main tail assembly pivotally connected to the rearward end thereof with the pivotal connection therebetween being located forwardly of the centerline of the rear axle of the trailer suspension system. The location of the hinge between the main deck and the main tail assembly, by being located forwardly of the centerline of the rear axle, provides a main tail having an increased length thereby providing a lower loading angle without increasing the overall length of the trailer.

14 Claims, 7 Drawing Sheets

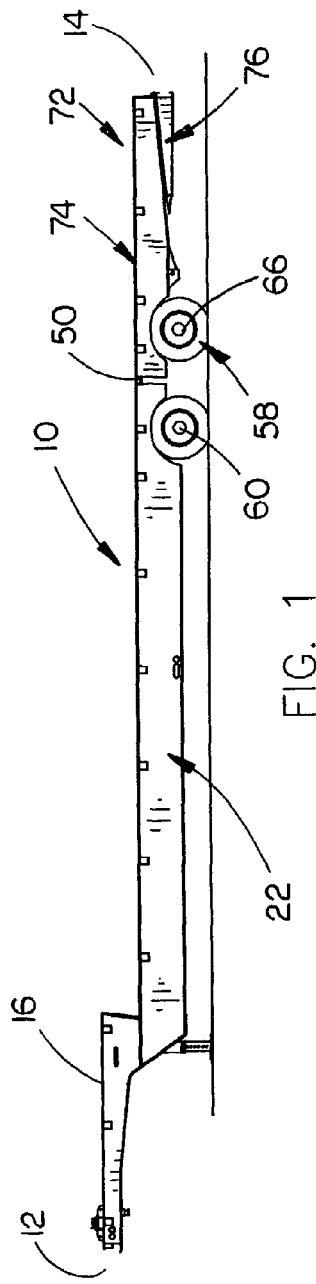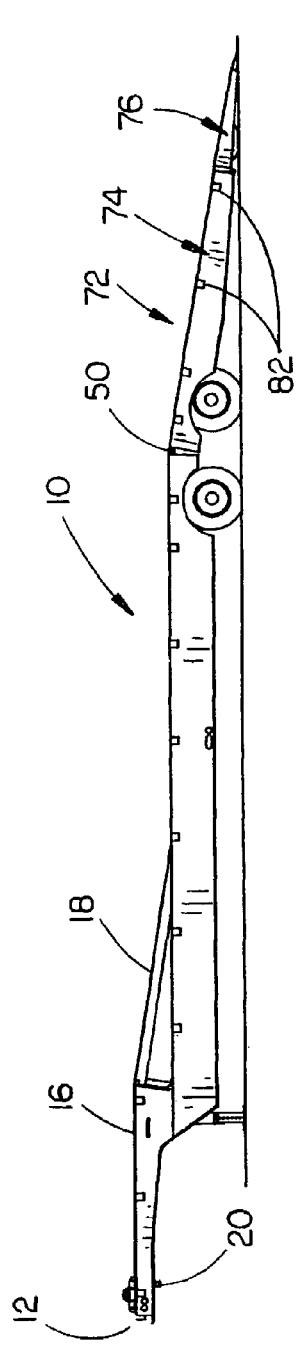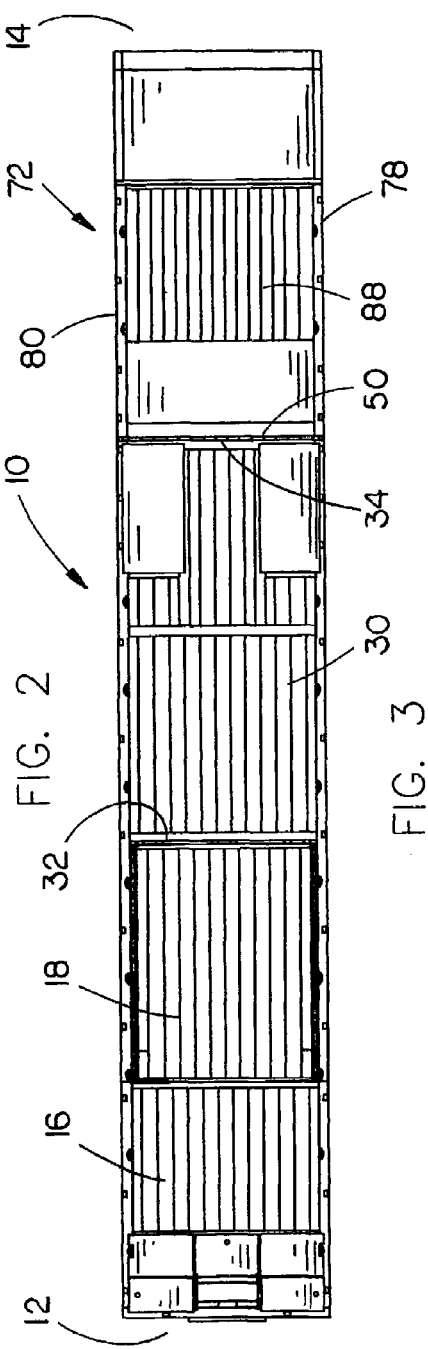

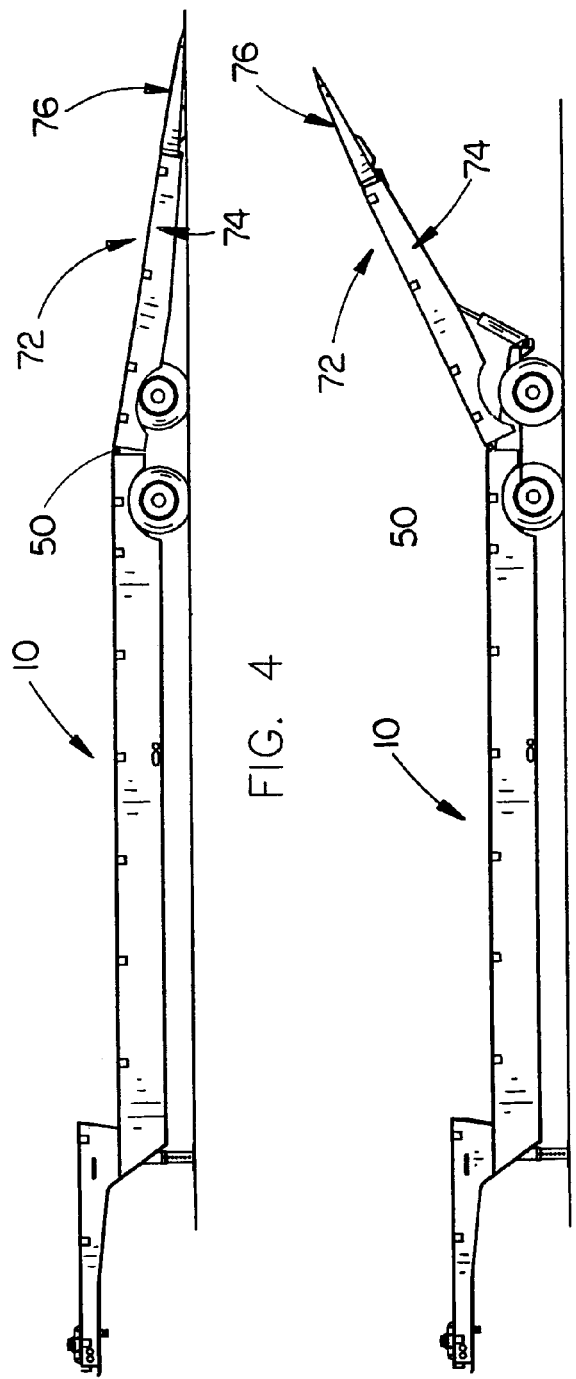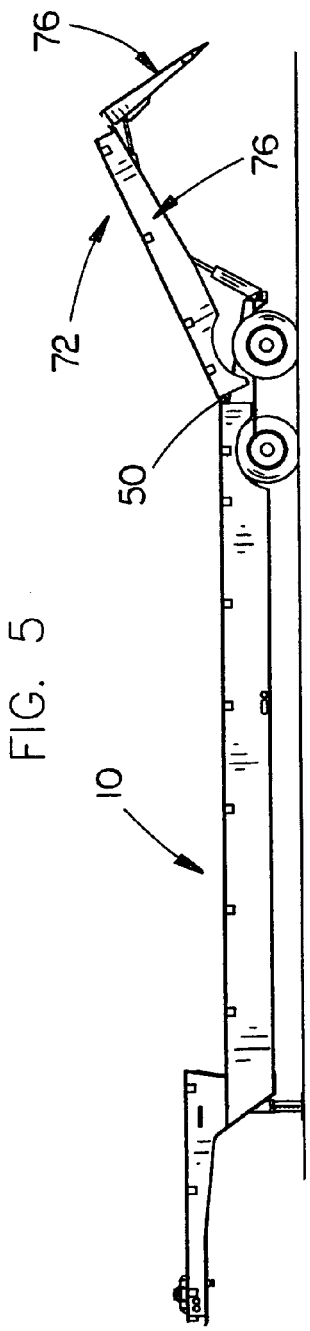
FIG. 4
FIG. 5
FIG. 6

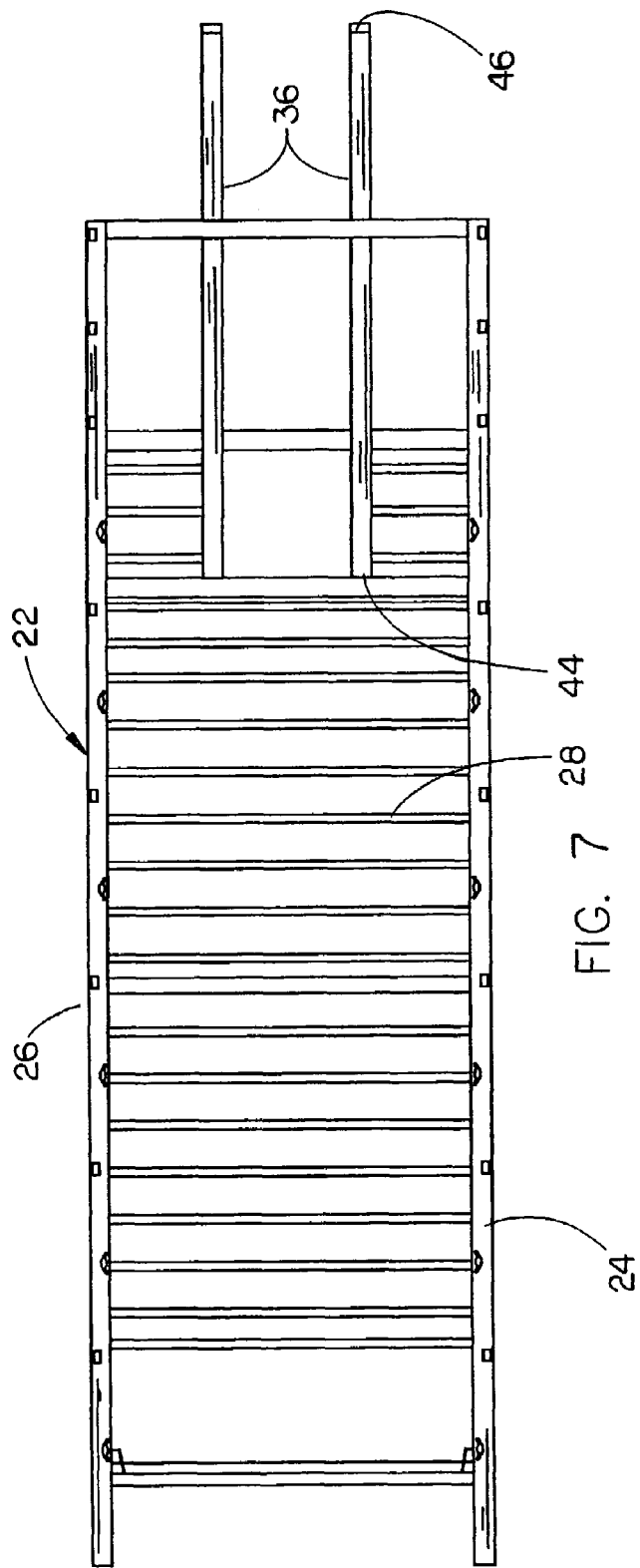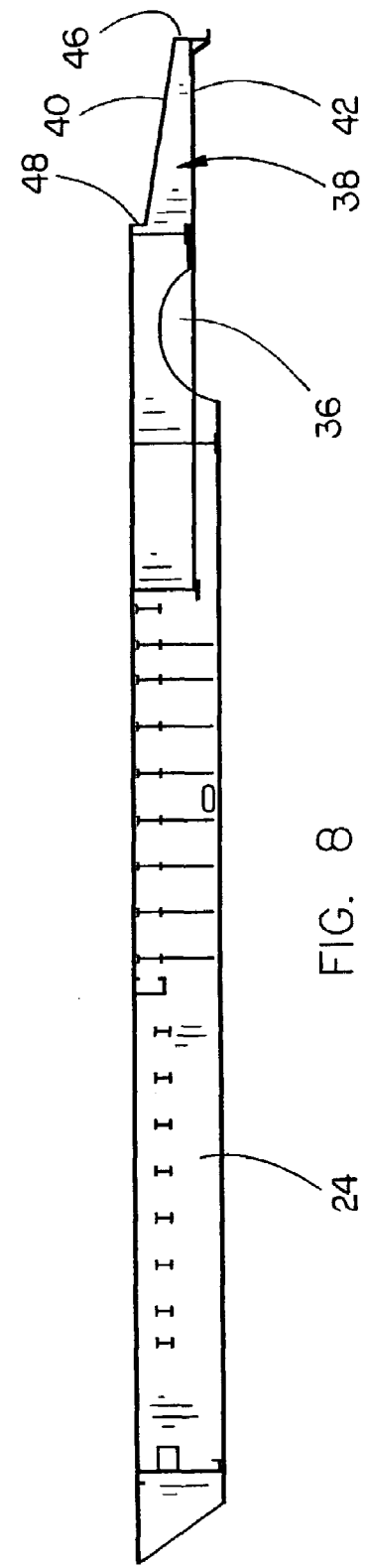

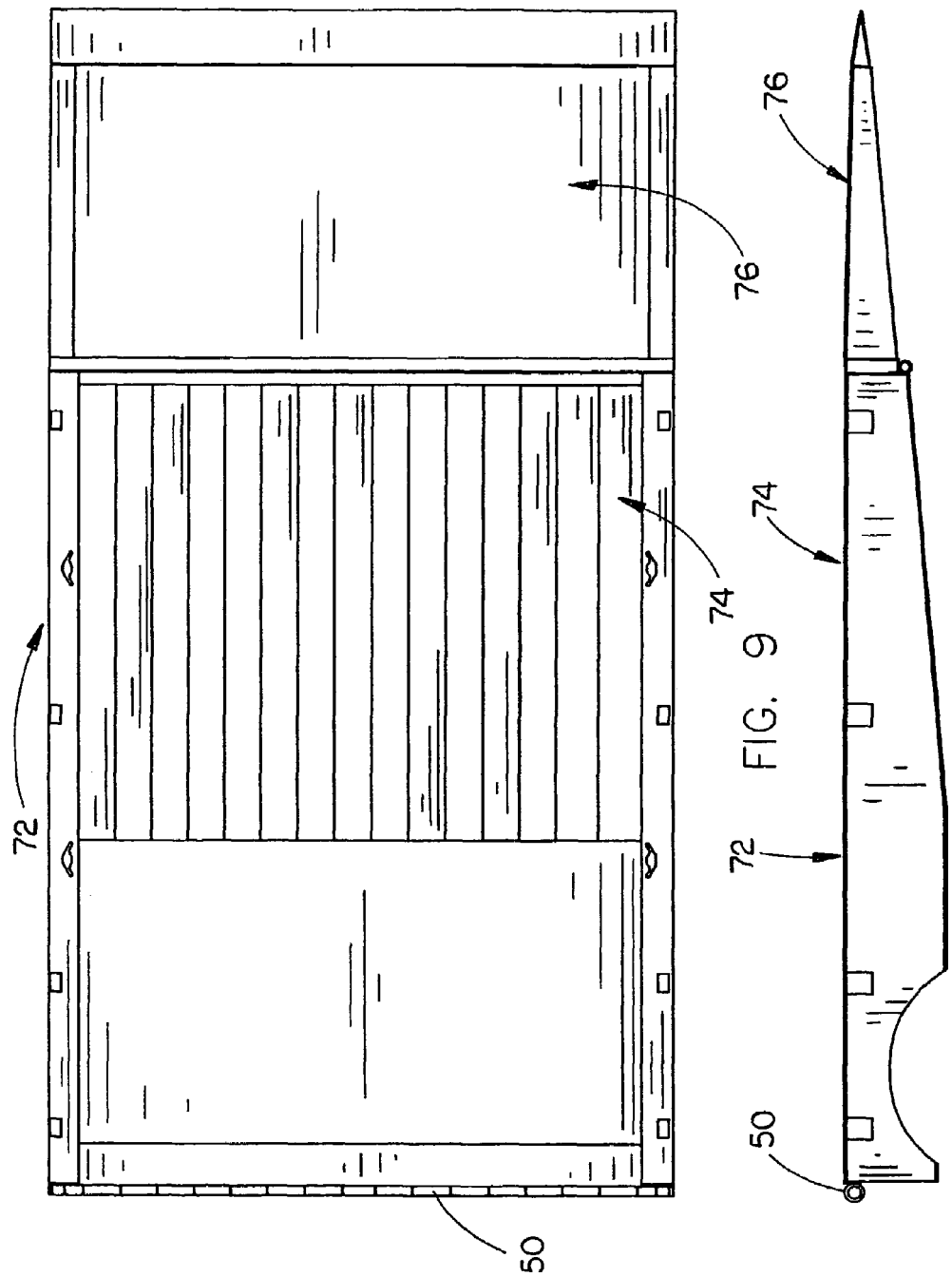

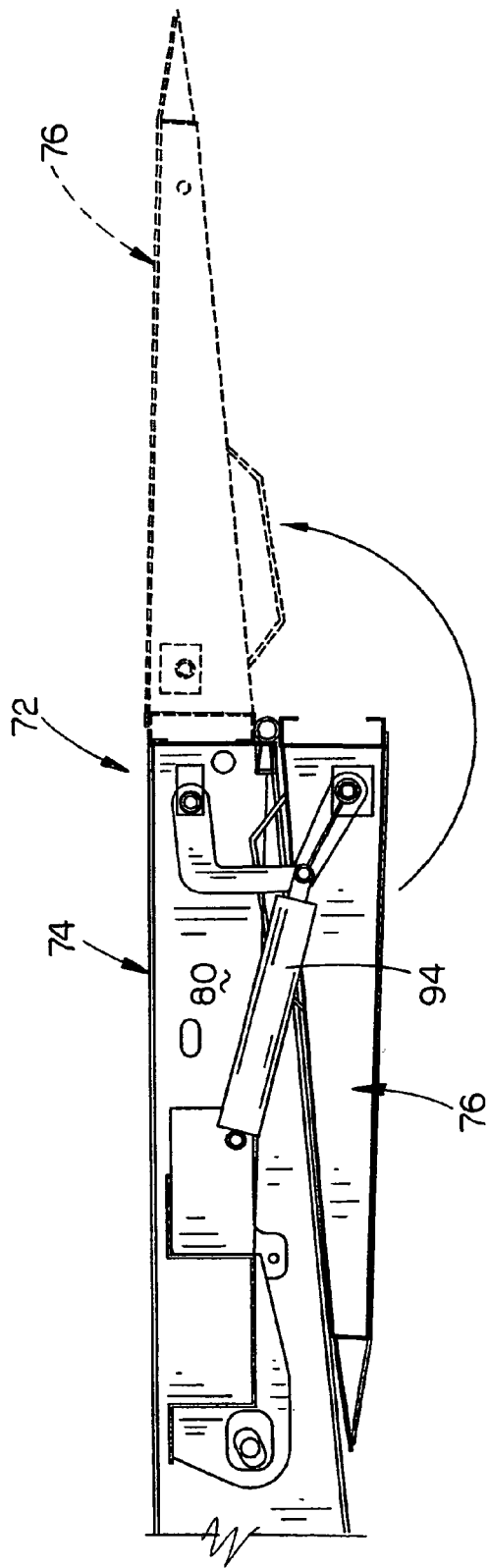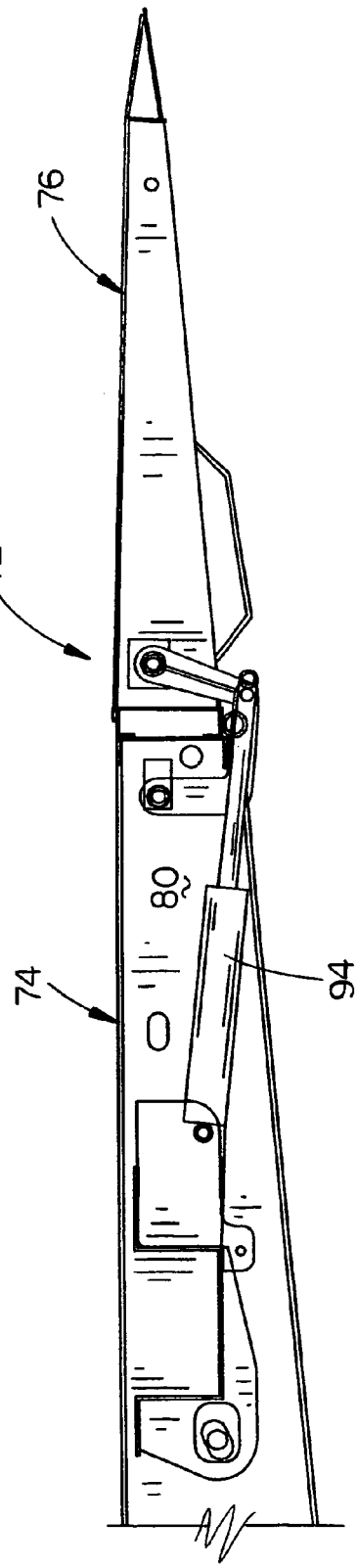
FIG. 11
FIG. 12

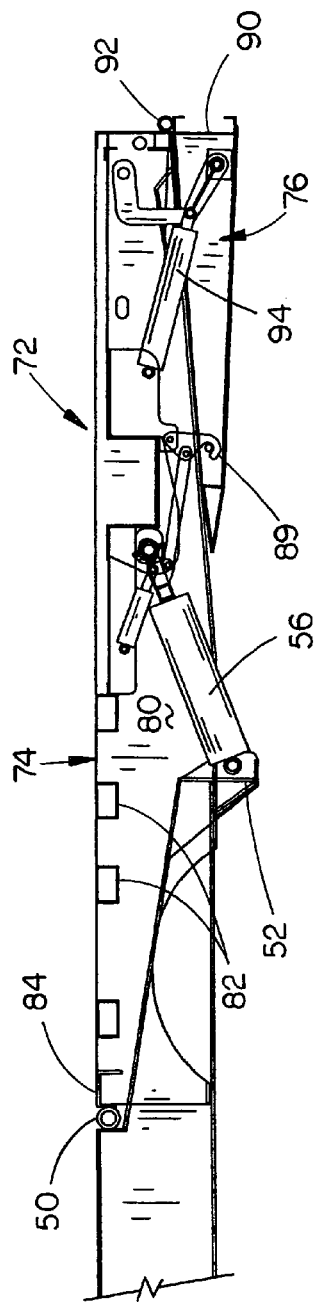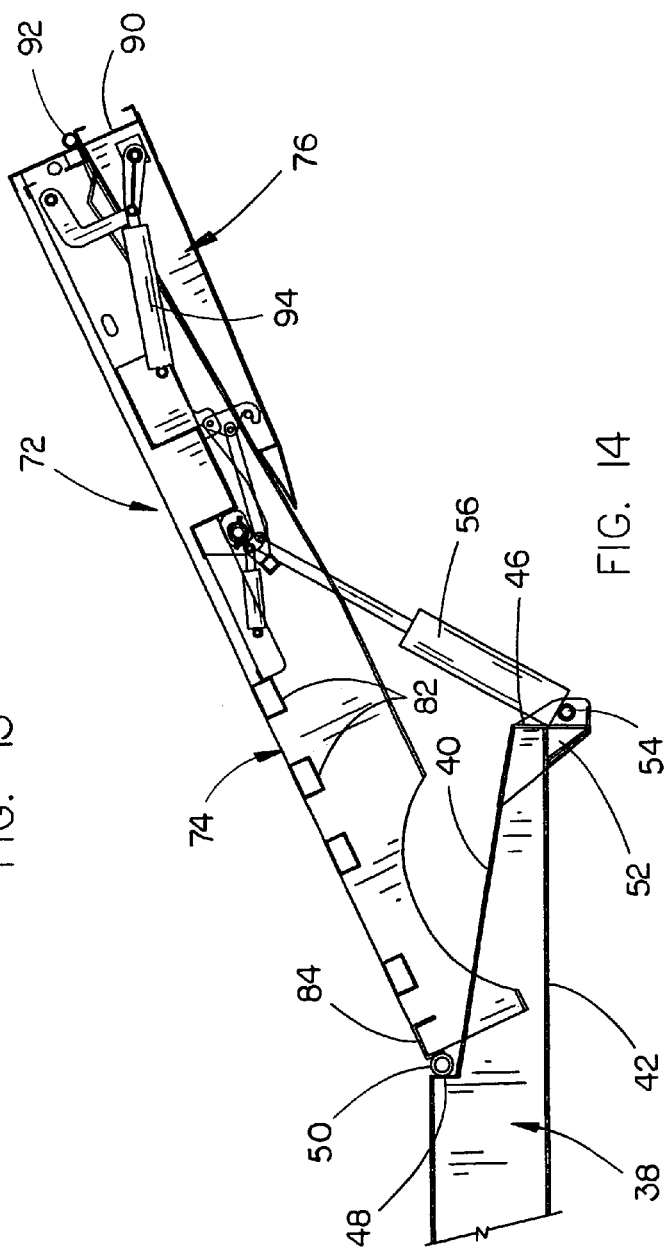

HYDRAULIC TAIL TRAILER

BACKGROUND OF THE INVENTION

1. Field of the Invention

This invention relates to a hydraulic tail trailer and more particularly to a hydraulic tail trailer wherein the main tail is hingedly connected to the trailer frame forward of the centerline of the rear axle of the suspension system thereby providing a lower load angle due to an increased tail length while maintaining the same overall trailer length.

2. Description of the Related Art

The trailer transportation of heavy or large farm and industrial equipment requires special loading ramps at the rear end of the trailer. In a typical hydraulic tail trailer of the prior art, a hinged tail ramp is pivotally or hingedly secured to the rear end of a main frame or main deck so that the rearward end of the main tail may be lowered into ground engagement. In some of the prior art trailers, the main tail's hinge point is located at the centerline of the rear axle of the suspension system or is located rearwardly of the rear axle of the suspension system. The location of the hinge at the centerline of the rear axle or rearwardly of the centerline of the rear axle results in the loading angle of the main tail being quite large. The large loading angle of the main tail also results in a significant angle being present between the main deck and the main tail deck which may cause the equipment being loaded or unloaded to "high center" at the juncture of the main deck and the main tail.

SUMMARY OF THE INVENTION

A hydraulic tail trailer is disclosed comprising a main frame having rearward and forward ends with the main frame including at least first and second longitudinally extending side frame members. Longitudinally extending first and second running gear beams having rearward and forward ends and upper and lower ends are operatively secured to the main frame and have rearwardly extending portions which extend rearwardly from the rearward end of the main frame. A suspension system is provided for supporting the rearward end of the trailer. The suspension system includes a front axle, having wheels secured to the opposite ends thereof, with the front axle being secured to the first and second running gear beams forwardly of the rear end of the main frame. The suspension system also includes a rear axle, having wheels secured to the opposite ends thereof. A rear suspension assembly operatively secures the rear axle to the first and second running gear beams rearwardly of the rearward end of the main frame. A main deck is mounted on the main frame with the rearward end of the main deck being positioned forwardly of the centerline of the rear axle. The trailer includes a hydraulically operated tail assembly having rearward and forward ends with the forward end of the tail assembly being pivotally secured to the main frame at the rearward end thereof. The pivotal connection of the forward end of the tail assembly to the rearward end of the main frame is positioned forwardly of the centerline of the rear axle.

The tail assembly includes a main tail and a flip tail. A pair of hydraulic cylinders interconnect the lower rearward ends of the running gear beams to the main tail for pivotally moving the main tail. A hydraulic cylinder pivotally interconnects the main tail and the flip tail to enable the flip tail to be pivotally moved with respect to the main tail.

It is therefore a principal object of the invention to provide a hydraulic tail trailer wherein the main tail's hinge point is located forward of the centerline of the rear axle of the trailer.

Still another object of the invention is to provide a hydraulic tail trailer wherein the main tail's hinge point is located forwardly of the centerline of the rear axle to provide a lower load angle due to increased tail length while maintaining the same overall trailer length.

Still another object of the invention is to provide a hydraulic tail trailer including a main tail which has a lower load angle than prior art trailers due to its increased tail length without lengthening the overall length of the trailer.

Yet another object of the invention is to provide a hydraulic tail trailer which is durable in use and refined in appearance.

These and other objects will be apparent to those skilled in the art.

BRIEF DESCRIPTION OF THE DRAWINGS

FIG. 1 is a side view of the trailer of this invention in its transport position;

FIG. 2 is a side view of the trailer in its loading position;

FIG. 3 is a top view of the trailer;

FIGS. 4-6 are side views of the trailer partially illustrating the manner in which the main tail and flip tail are moved as the tail is moved down from its loading position towards its transport position;

FIG. 7 is a top view of the main frame and running gear beams;

FIG. 8 is a side view of FIG. 7;

FIG. 9 is a top view of the tail assembly;

FIG. 10 is a side view of FIG. 9;

FIG. 11 is a side view of the rear end of the main tail with the flip tail being in its stowed position;

FIG. 12 is a side view similar to FIG. 11 except that the flip tail has been pivoted to its operative position;

FIG. 13 is a side view of the main tail assembly and the rearward end of the frame with the main tail assembly being in its transport position;

FIG. 14 is a side view similar to FIG. 13 except that the main tail assembly has been raised to enable the flip tail to be in a position so that it may be moved to its operative position.

DETAILED DESCRIPTION OF THE INVENTION

Figure 15:
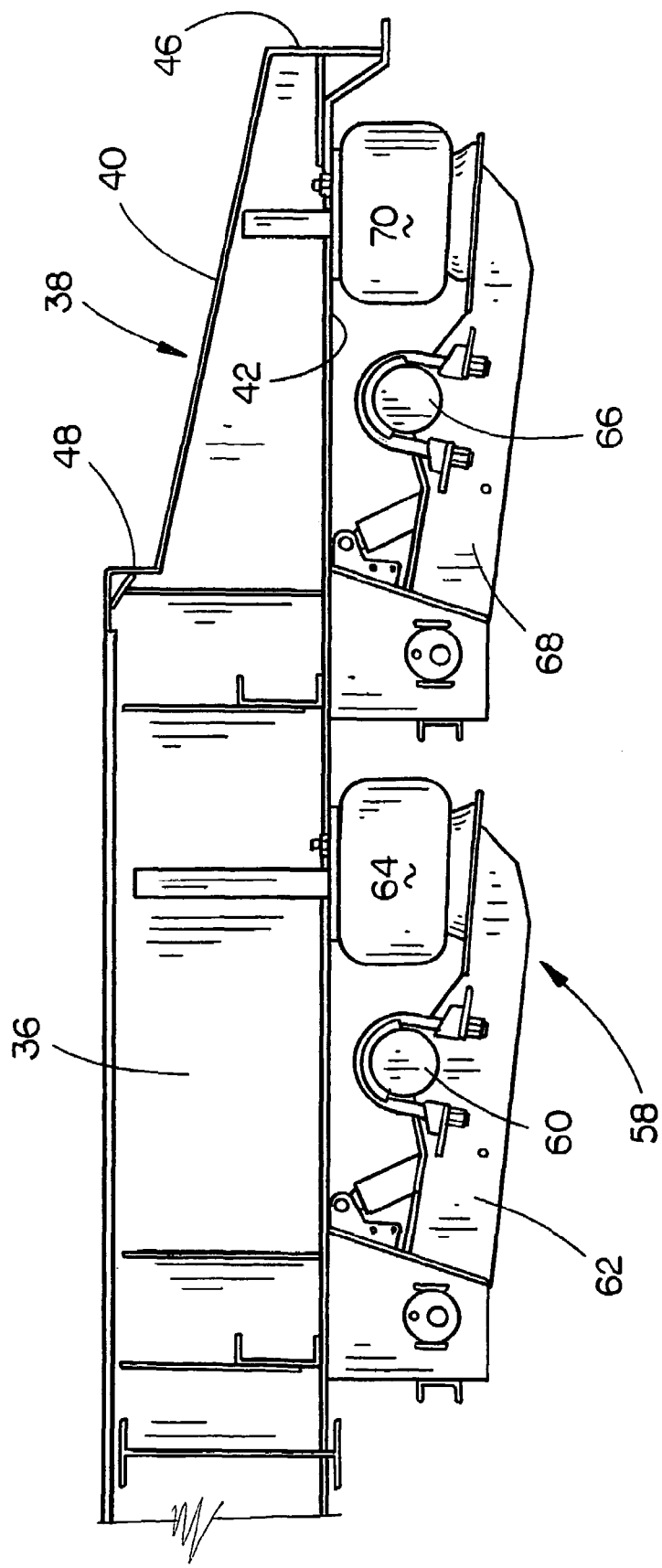
FIG. 15 is a partial side view of the suspension system of the trailer.

The hydraulic tail trailer of this invention is referred to generally by the reference numeral 10 and includes a forward end 12 and a rearward end 14. Trailer 10 may include a conventional upper deck section 16 and a hydraulically operated upper deck ramp 18 of conventional design. A king pin 20 is provided at the underside of the forward end of the trailer to enable the trailer to be connected to a prime mover such as a truck having a fifth wheel assembly mounted thereon.

Trailer 10 includes a wheeled frame means 22 having first and second main frame beams 24 and 26 which are interconnected by cross-members 28 (FIG. 7). The numeral 30 refers to a main deck which is supported upon the main frame beams 24, 26 and the cross-members 28 with the main deck 30 having a forward end 32 and a rearward end 34 (FIG. 3). A pair of running gear beams 36 are secured to the frame means 22 between the main frame beams 24, 26 with each of the beams 36 having rearwardly extending portions 38 which have an upper end 40, lower end 42, forward end 44 and rearward end 46. As seen in FIG. 8, the beams 36 are provided with a shoulder or step 48 at the forward end of the rearwardly extending portion 38 to accommodate a hinge or tail ramp pivot 50 (FIG. 14). Each of the beams 36 has a hydraulic cylinder bracket 52 secured thereto which has a pin opening 54 formed therein below the lower end 42 of portion 38. The base end of a hydraulic cylinder 56 is pivotally secured to each of the brackets 52 by means of a pivot pin extending through opening 54. As seen in FIG. 14, the upper end 40 of portion 38 extends downwardly at an angle from its forward end to its rearward end.

The numeral 58 refers to the suspension system of this trailer which is generally of conventional design (FIG. 15). Suspension system 58 includes a front axle 60 having one or more wheels mounted on the opposite ends thereof. Axle 60 is mounted on a pair of spaced-apart arms 62 which are pivotally secured to the running gear beams 36, respectively. An air bag 64 is positioned between the upper rearward end of each of the arms 62 and the associated running gear beam 36. Suspension system 58 also includes a rear axle 66 having one or more wheels mounted on the opposite ends thereof. Axle 66 is mounted on a pair of spaced-apart arms 68 which are pivotally secured to the running gear beams, respectively. An air bag 70 is positioned between the upper rearward end of each of the arms 68 and the associated running gear beam 36.

The numeral 72 refers to a hydraulic tail assembly which is pivotally secured to the rearward end of the frame means 22 and which includes a main tail 74 and a flip tail 76. Main tail 74 includes a pair of spaced-apart side frames or beams 78 and 80 having cross-members 82 secured thereto and extending therebetween. Frame or plate 84 is secured to and extends between the forward ends of beams 78 and 80. The forward end of main tail 74 is hingedly connected to the rearward end 34 of main deck 30 by hinge 50 which is hingedly secured to plate 84, to the rearward ends of main frame beams 24, 26 and to the running gear beams 36 adjacent shoulders 48.

Main tail 74 is provided with a deck 88 positioned on the cross-members 82 and which extends between side beams 78 and 80. The rod ends of hydraulic cylinders 56 are pivotally connected to the underside of the main tail 74 for moving the main tail 74 from a first load carrying position (FIGS. 1, 13) wherein the deck 88 of main tail 74 is parallel to main deck 30 to a second position wherein main tail 74 extends upwardly and rearwardly from main deck 30 (FIG. 14) to a third position wherein main tail 74 extends downwardly and rearwardly relative to main deck 30 (FIGS. 2, 4).

Flip tail 76 is hingedly connected at its forward end 90 to the lower rearward end of main tail 74 by hinge 92 (FIG. 13). A hydraulic cylinder 94 is pivotally connected to and extends between main tail 74 and flip tail 76 for pivotally moving flip tail 76 from a stowed position beneath the rearward end of main tail 74 (FIG. 13) to an operative position (FIGS. 2, 4, 5) so that the upper deck surface of flip tail 76 is parallel to and in alignment with the deck 88 of main tail 74. Generally conventional locking means 89 is provided for maintaining flip tail 76 in its stowed position (FIG. 13). Further, means is provided for maintaining main tail 74 in its load carrying position so that undue stress is not imposed on the hydraulic cylinders 56.

Trailer 10 is illustrated in its transport position in FIG. 1. In the position of FIG. 1, flip tail 76 is in its stowed position beneath the rearward end of main tail 74 with the deck of main tail 74 being parallel with the main deck 30. As seen in FIG. 1, the pivot 50 is located approximately mid-way between axles 60 and 66. By moving the pivot 50 forwardly from that which is commonly used or known in the prior art, the length of the main tail 74 is increased, without increasing the overall trailer length. The location of the pivot 50 mid-way between the axles 60 and 66 reduces the loading angle of the main tail assembly 72 which enhances the loading of heavy and large equipment onto the trailer without that equipment "high centering" at the pivot 50.

Assuming that the trailer is in the position of FIG. 1 and it is desired to move the main tail assembly to its loading position of FIG. 4, the hydraulic cylinders 56 are extended from the position of FIG. 13 to the position of FIG. 14 which causes the main tail assembly 72 to be moved upwardly from the parallel position. When the main tail assembly 72 has been raised to the position of FIG. 14, the hydraulic cylinder or cylinders 94 are extended from the position of FIG. 11 to the position of FIG. 12 so that the flip tail 76 is moved from its stowed position of FIG. 14 to the operative position illustrated by broken lines in FIG. 11 and illustrated by solid lines in FIG. 12. When the flip tail 76 has been pivoted so as to be parallel to main tail 74, the hydraulic cylinders 56 are retracted until the rearward end of the flip tail 76 moves into ground engagement, as illustrated in FIGS. 2 and 4.

When the main tail assembly is in the position of FIG. 4, equipment may be loaded onto the trailer or unloaded therefrom. The design of the pivot of the main tail assembly 72, by being located forwardly of the rear axle 66, provides a reduced loading angle as compared to that of the prior art as discussed hereinabove. When it is desired to move the main tail assembly 72 from the position of FIG. 4 to the transport position, hydraulic cylinders 56 are extended to raise the main tail assembly 72 to the position illustrated in FIG. 5. When the main tail assembly 72 is in the position of FIG. 5, the hydraulic cylinder or cylinders 94 are retracted from the position of FIG. 12 to the position of FIG. 11 so that flip tail 76 is stowed beneath the rearward end of main tail 74. When the flip tail 76 has been positioned as illustrated in FIG. 14, the hydraulic cylinders 56 are then retracted to lower the main tail assembly 72 until it is in the position of FIG. 1.

The positioning of the hinge 50 to a position forwardly of the rear axle 66 is made possible by providing the rearwardly and downwardly extending surfaces 40 on the beams 38 so that there will be sufficient clearance between the cross-members 82 and the rearward ends of the running gear beams 38. The fact that the base ends of the hydraulic cylinders 56 are pivoted to the beams 38 at a location below the lower end 42 thereof, also is a factor in providing sufficient clearance for the hydraulic cylinders 56.

Although it is preferred that hydraulic cylinders are utilized to raise and lower the main tail assembly with respect to the main frame, other mechanical means could also be employed. Further, although it is preferred that one or more hydraulic cylinders are utilized to operate the flip tail, other mechanical or manual means could also be employed.

It can therefore be seen that a unique trailer has been provided which includes a main tail assembly having a loading length which is greater than that of the prior art with the increased loading length providing a lower loading angle without increasing the overall length of the trailer.

Thus it can be seen that the invention accomplishes at least all of its stated objectives.

We claim:
1. A hydraulic tail trailer, comprising:
a main frame having rearward and forward ends;
said main frame including at least first and second longitudinally extending side frame members;
longitudinally extending first and second running gear beams, having rearward and forward ends and upper and lower ends, secured to said main frame in a fixed non-movable manner;

each of said first and second running gear beams having rearwardly extending portions which extend rearwardly from said rearward end of said main frame;

a front axle, having first and second ends;

wheels secured to said first and second ends of said front axle;

a front suspension assembly securing said front axle to said first and second running gear beams forwardly of the rearward end of said main frame in a single longitudinally non-movable position;

a rear axle, having first and second ends;

wheels secured to said first and second ends of said rear axle;

a rear suspension assembly securing said rear axle to said first and second running gear beams rearwardly of said rearward end of said main frame in a single longitudinally non-movable position;

said front and rear axles being longitudinally fixed relative to said main frame;

a main deck mounted on said main frame and having rearward and forward ends;

said rearward end of said main deck being positioned forwardly of the centerline of said rear axle;

a hydraulically operated tail assembly, having rearward and forward ends;

said forward end of said tail assembly being pivotally secured to said main frame at the rearward end thereof;

the pivotal connection of said forward end of said tail assembly to said rearward end of said main frame being positioned forwardly of the centerline of said rear axle.

2. The hydraulic tail trailer of claim 1 wherein the pivotal connection of said forward end of said tail assembly to said rearward end of said main frame is positioned approximately midway between the centerline of said rear and front axles.

3. The hydraulic tail trailer of claim 1 wherein said upper ends of said rearwardly extending portions of said first and second running gear beams extend downwardly and rearwardly from said main frame so that the upper rearward ends of said first and second running gear beams are located in a plane below the upper forward ends of said rearwardly extending portions.

4. The hydraulic tail trailer of claim 3 wherein a first hydraulic cylinder, having upper and lower ends, is pivotally secured at its lower end to the lower rearward end of said first running gear beam and is pivotally secured at its upper end to said tail assembly and wherein a second hydraulic cylinder, having upper and lower ends, is pivotally secured to the lower rearward end of said second running gear beam and is pivotally secured at its upper end to said tail assembly.

5. The hydraulic tail trailer of claim 4 wherein the pivotal connections of said first and second hydraulic cylinders to said first and second running gear beams are below the said lower ends thereof.

6. The hydraulic tail trailer of claim 4 wherein said tail assembly includes a main tail, having a rearward end, a forward end, an upper end, and a lower and further includes a flip tail, having a rearward end, a forward end, an upper end, and a lower end; said forward end of said flip tail being pivotally secured to said rearward end of said main tail; and wherein a hydraulic cylinder is pivotally secured to said main tail and said flip tail for pivotally moving said flip tail from a stowed position beneath said main tail to an operative position.

7. The hydraulic tail trailer of claim 6 wherein said first and second hydraulic cylinders are capable of pivotally moving said tail assembly between a first position wherein said main tail is parallel with said main deck, to a second upwardly and rearwardly extending position with respect to said main deck and to a third downwardly and rearwardly extending position with respect to said main deck.

8. A tail trailer, comprising:

a main frame having rearward and forward ends;

said main frame including at least first and second longitudinally extending side frame members;

longitudinally extending first and second running gear beams having rearward and forward ends and upper and lower ends, secured to said main frame in a fixed non-movable manner;

each of said first and second running gear beams having rearwardly extending portions which extend rearwardly from said rearward end of said main frame;

a front axle, having first and second ends;

wheels secured to said first and second ends of said front axle;

a front suspension assembly securing said front axle to said first and second running gear beams forwardly of the rearward end of said main frame in a single longitudinally non-movable position;

a rear axle, having first and second ends;

wheels secured to said first and second ends of said rear axle;

a rear suspension assembly securing said rear axle to said first and second running gear beams rearwardly of said rearward end of said main frame in a single longitudinally non-movable position;

a main deck mounted on said main frame and having rearward and forward ends;

said front and rear axles being longitudinally fixed relative to said main frame;

said rearward end of said main deck being positioned forwardly of the centerline of said rear axle;

a tail assembly, having rearward and forward ends;

said forward end of said tail assembly being pivotally secured to said main frame at the rearward end thereof;

the pivotal connection of said forward end of said tail assembly to said rearward end of said main frame being positioned at the centerline of said rear axle or forwardly thereof.

9. The tail trailer of claim 8 wherein the pivotal connection of said forward end of said tail assembly to said rearward end of said main frame is positioned approximately midway between the centerline of said rear and front axles.

10. The tail trailer of claim 8 wherein said upper ends of said rearwardly extending portions of said first and second running gear beams extend downwardly and rearwardly from said main frame so that the upper rearward ends of said first and second running gear beams are located in a plane below the upper forward ends of said rearwardly extending portions.

11. The tail trailer of claim 10 wherein a first hydraulic cylinder, having upper and lower ends, is pivotally secured at its lower end to the lower rearward end of said first running gear beam and is pivotally secured at its upper end to said tail assembly and wherein a second hydraulic cylinder, having upper and lower ends, is pivotally secured to the lower rearward end of said second running gear beam and is pivotally secured at its upper end to said tail assembly.

12. The tail trailer of claim 11 wherein the pivotal connections of said first and second hydraulic cylinders to said first and second running gear beams are below the said lower ends thereof.

13. The tail trailer of claim 10 wherein said tail assembly includes a main tail, having a rearward end, a forward end, an upper end, and a lower end and further includes a single flip tail, having a rearward end, a forward end, an upper end, and a lower end; said forward end of said flip tail being pivotally secured to said rearward end of said main tail; said flip tail being pivotally movable from a stowed position beneath said main tail to an operative position.

14. The tail trailer of claim 13 wherein a hydraulic cylinder means pivotally moves said tail assembly between a first position wherein said main tail is parallel with said main deck, to a second upwardly and rearwardly extending position with respect to said main deck and to a third downwardly and rearwardly extending position with respect to said main deck.

\* \* \* \* \*